United States Patent
Nguyen et al.

(10) Patent No.: US 9,973,504 B2
(45) Date of Patent: *May 15, 2018

(54) PRE-AUTHORIZING A CLIENT APPLICATION TO ACCESS A USER ACCOUNT ON A CONTENT MANAGEMENT SYSTEM

(71) Applicant: Dropbox, Inc., San Francisco, CA (US)

(72) Inventors: Huy Nguyen, San Francisco, CA (US); Josh Kaplan, San Francisco, CA (US); Viraj Mody, San Francisco, CA (US); Ritu Vincent, San Francisco, CA (US); Andrew Bortz, San Francisco, CA (US); David Euresti, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 36 days.

This patent is subject to a terminal disclaimer.

(21) Appl. No.: 14/984,255

(22) Filed: Dec. 30, 2015

(65) Prior Publication Data

US 2016/0112426 A1    Apr. 21, 2016

Related U.S. Application Data

(63) Continuation of application No. 14/135,332, filed on Dec. 19, 2013, now Pat. No. 9,258,291.

(51) Int. Cl.
*G06F 7/04* (2006.01)
*H04L 29/06* (2006.01)
(Continued)

(52) U.S. Cl.
CPC ............... *H04L 63/10* (2013.01); *G06F 8/61* (2013.01); *G06F 21/335* (2013.01); *G06F 21/41* (2013.01);
(Continued)

(58) Field of Classification Search
None
See application file for complete search history.

(56) References Cited

U.S. PATENT DOCUMENTS 8,473,749 B1   6/2013   Madsen et al.
9,380,040 B1 *  6/2016   Aplemakh ............ H04L 47/824
(Continued)

FOREIGN PATENT DOCUMENTS

EP    2 365 677 A1    9/2011
WO    02/23432 A1    3/2002

OTHER PUBLICATIONS

PCT International Search Report and Written Opinion dated Mar. 17, 2015 in Application No. PCT/US2014/055905, filed Sep. 16, 2014, titled, Pre-Authorizing a Client Application to Access a User Account on a Content Management System, Applicant: Dropbox, Inc., 12 pages.

*Primary Examiner* — Brandon S Hoffman
(74) *Attorney, Agent, or Firm* — Polsinelli PC (57) ABSTRACT

A content management system can tag a client installer with an information tag linking the client installer to a user account. The client installer can be configured to install the client-side application on the client device and pass the identification tag to the installed client-side application. The client-side application can transmit the identification tag to the content management system, which can use the identification tag to identify the linked user account and log the client-side application into the user account. The content management system can implement several verification measures such as limiting the number of times and when an identification tag can be used, as well as IP addresses that can use the identification tag. The content management system can also use data cached by the web-browser appli-
(Continued)

cation to determine if the web-browser application was used to access the user account in the past.

21 Claims, 7 Drawing Sheets

(51) Int. Cl.
*H04L 29/08* (2006.01)
*G06F 9/445* (2018.01)
*G06F 21/33* (2013.01)
*G06F 21/41* (2013.01)
*G06F 21/62* (2013.01)

(52) U.S. Cl.
CPC .......... *G06F 21/6218* (2013.01); *H04L 63/08* (2013.01); *H04L 63/0807* (2013.01); *H04L 63/102* (2013.01); *H04L 63/108* (2013.01); *H04L 67/34* (2013.01); *G06F 2221/2117* (2013.01); *G06F 2221/2137* (2013.01); *H04L 67/02* (2013.01)

(56) References Cited

U.S. PATENT DOCUMENTS

| | | |
|---|---|---|
| 2003/0196119 A1* | 10/2003 | Raley .................. G06F 21/10 726/7 |
| 2010/0077216 A1 | 3/2010 | Kramer et al. |
| 2014/0189808 A1 | 7/2014 | Mahaffey et al. |

* cited by examiner

PRE-AUTHORIZING A CLIENT APPLICATION TO ACCESS A USER ACCOUNT ON A CONTENT MANAGEMENT SYSTEM

CROSS REFERENCE TO RELATED APPLICATIONS

This application is a continuation of U.S. patent application Ser. No. 14/135,332, filed, Dec. 19, 2013, now U.S. Pat. No. 9,258,291, which is incorporated herein by reference in its entirety and for all purposes.

TECHNICAL FIELD

The present technology pertains to installing a client-side application on a client device, and more specifically pertains to pre-authorizing the client-side application to access a specified user account upon installation.

BACKGROUND

Cloud storage accounts allow users to store their content items in an online user account that can be accessed from any computing device with a network connection. Users can upload content items such as pictures, songs, documents, etc. from a computing device to their online user account and later access the content items from different computing devices.

To access their user account, a user can use a web-browser application installed on their client device. For example, the user can use the web-browser to access the content management system and provide login credentials to access their user account. Alternatively, a user can use a client-side application to access their user account on the content management system. For example, a user can use the web-browser application to download a client installer from the content management system, which can then be used to install the client application.

Current systems require a user to re-enter their login credentials to log in to their user account on the client-side application, even if the user is currently logged in using the web-browser application or was logged in when requesting to install the client-side application. Providing a client installer configured to automatically log the user in to their user account eliminates the need for a user to re-enter their login credentials, but poses a security risk if the client installer is used by a different user. Accordingly, an improvement is needed.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for pre-authorizing a client-side application to access a user account on a content management system. A user can access their user account on a content management system using a web-browser application and, while logged into their user account, request to install a client-side application that can also be used to access their user account.

The content management system can pre-authorize the client-side application to automatically log in to the requesting user's user account upon installation without requiring the user to provide their login credentials a second time. To accomplish this, the content management system can tag a client installer with an information tag linking the client installer to the user account. The client installer can be configured to install the client-side application on the client device and pass the identification tag to the installed client-side application. The client-side application can transmit the identification tag to the content management system, which can use the identification tag to identify the linked user account and log the client-side application into the user account.

The content management system can implement several verification measures to ensure that the client-side application is only pre-authorized when installed by the appropriate user. Verification measures can include limiting the number of times that an identification tag can be used to pre-authorize a client-side application, restricting the amount of time that the identification tag is valid and/or limiting the IP addresses that can use the identification tag.

The content management system can further restrict use of the identification tag to a client device associated with the user account. The content management system can use data cached by the web-browser application to determine if the web-browser application was used to access the user account in the past. To gather the cached data, the content management system can tag the client installer with a web-browser identifier that identifies the web-browser application used to request installation of the client-side application. The installed client-side application can use the web-browser identifier to identify the web-browser application and transmit the cached data to the content management system.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for pre-authorizing a client-side application to access a user account on a content management system. A user can access their user account on a content management system using a web-browser application and, while logged into their user account, request to install a client-side application that can also be used to access their user account.

The content management system can pre-authorize the client-side application to automatically log in to the requesting user's user account upon installation without requiring the user to provide their login credentials a second time. To accomplish this, the content management system can tag a client installer with an information tag linking the client installer to the user account. The client installer can be configured to install the client-side application on the client device and pass the identification tag to the installed client-side application. The client-side application can transmit the identification tag to the content management system, which can use the identification tag to identify the linked user account and log the client-side application into the user account.

The content management system can implement several verification measures to ensure that the client-side application is only pre-authorized when installed by the appropriate user. Verification measures can include limiting the number of times that an identification tag can be used to pre-authorize a client-side application, restricting the amount of time that the identification tag is valid and/or limiting the IP addresses that can use the identification tag.

The content management system can further restrict use of the identification tag to a client device associated with the user account. The content management system can use data cached by the web-browser application to determine if the web-browser application was used to access the user account in the past. To gather the cached data, the content management system can tag the client installer with a web-browser identifier that identifies the web-browser application used to request installation of the client-side application. The installed client-side application can use the web-browser identifier to launch the identified web-browser application and transmit the cached data to the content management system.

Figure 1:
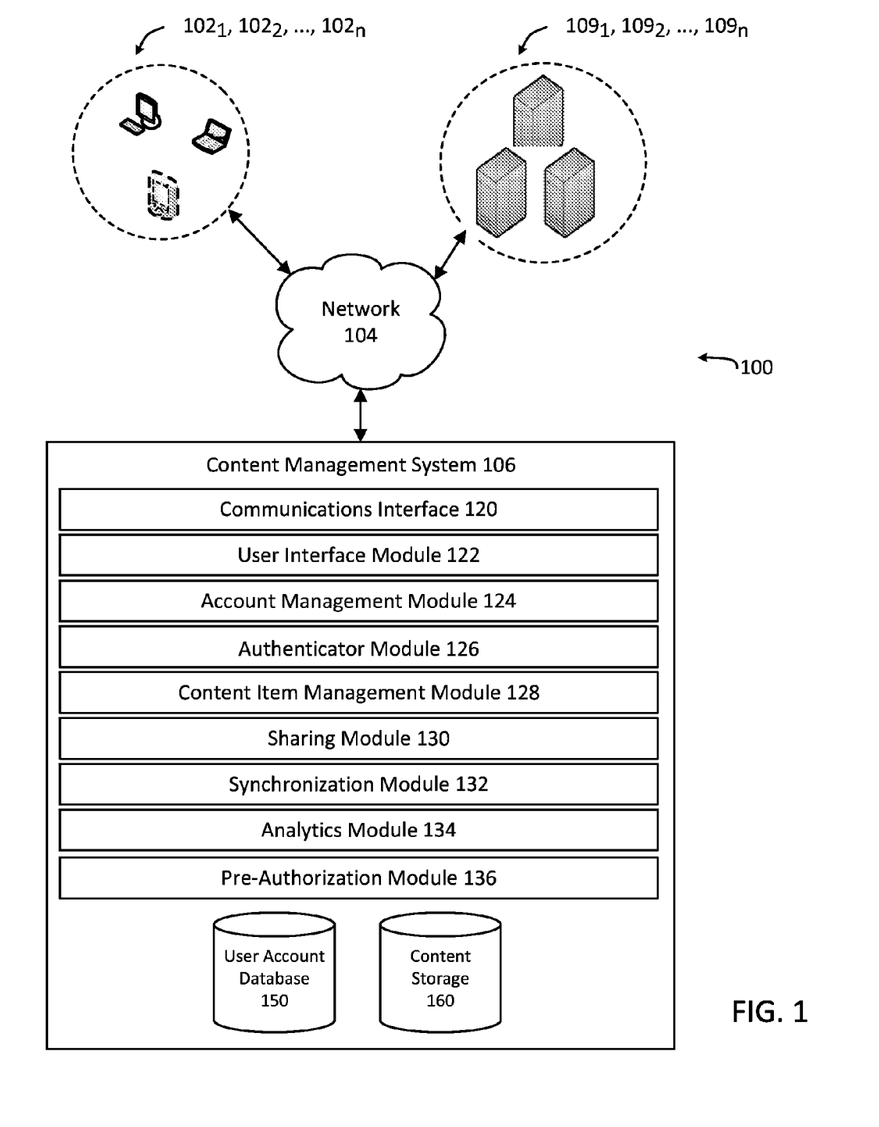
FIG. 1 shows an exemplary configuration of devices and a network in accordance with the invention.

An exemplary system configuration 100 is illustrated in FIG. 1, wherein electronic devices communicate via a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, ..., $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. A client-side application can include a content management system specific component. For example, the component can be a stand-alone application, one or more application plug-ins, and/or a browser extension. However, the user can also interact with content management system 106 via a third-party application, such as a web-browser application, that resides on client device $102_i$ and is configured to communicate with content management system 106. In either case, the client-side application or the third-party application can present a user interface (UI) for the user to interact with content management system 106. For example, the user can interact with the content management system 106 via a client-side application integrated with the file system or via a webpage displayed using a web-browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 via network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content via a web interface generated and served by user interface module 122. For example, the user can navigate in a web-browser to a web address provided by content management system 106. Changes or updates to content in the content storage 160 made through the web interface, such as uploading a new version of a file, can be propagated back to other client devices 102 associated with the user's account. For example, multiple client devices 102, each with their own client software, can be associated with a single account and files in the account can be synchronized between each of the multiple client devices 102.

Content management system 106 can include a communications interface 120 for interfacing with various client devices 102, and can interact with other content and/or service providers $109_1, 109_2, \ldots, 109_n$ (collectively "109") via an Application Programming Interface (API). Certain software applications can access content storage 160 via an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web-browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

While content management system 106 is presented with specific components, it should be understood by one skilled in the art, that the shown architectural configuration is simply one possible configuration and that other configurations with more or less components are also possible. For example, content management system 106 can include pre-authorization module 136 configured to tag a client installer to facilitate pre-authorization of a client-side application. That is, upon successful installation, the pre-authorized client-side application is automatically logged into a specified user account, allowing a user to access their user account without having to re-enter their login credentials.

The data tagged to the client installer can link the client installer to the specified user account. For example, pre-authorization module 136 can tag the client installer with an identification tag linking the client installer to the user account used to request installation of the client-side application. Upon execution, the tagged client installer can install the client-side application and pass the identification tag to the installed client-side application. The client-side application can then transmit the identification tag to content management system 106 to log the client-side application into the user account identified by the identification tag.

To accomplish this, pre-authorization module 136 can be configured to identify whether an installation request to install the client-side application is associated with an actively authorized user account. For example, a user can be logged into their user account using a web-browser application and, while logged in, request to install the client-side application. Pre-authorization module 136 can determine if the installation request was received while the user was logged into a user account. For example, pre-authorization module 136 can receive an installation request from client device 102$_i$ to install the client-side application on client device 102$_i$, and then determine if client device 102$_i$ is currently logged in and authorized to access a specified user account.

If installation request is associated with an actively authorized user account, pre-authorization module 136 can generate an identification tag and associate the identification tag with the user account. For example, pre-authorization module 136 can create an entry in a pre-authorization index that lists identification tags and their associated user account. Alternatively, the identification tag can include sufficient data to directly identify the user account. For example, the identification tag can include an account identifier identifying the specified user account. Pre-authorization module 136 can then provide the tagged client installer to the requesting client device, where it can be used to install the pre-authorized client-side application.

Figure 2:
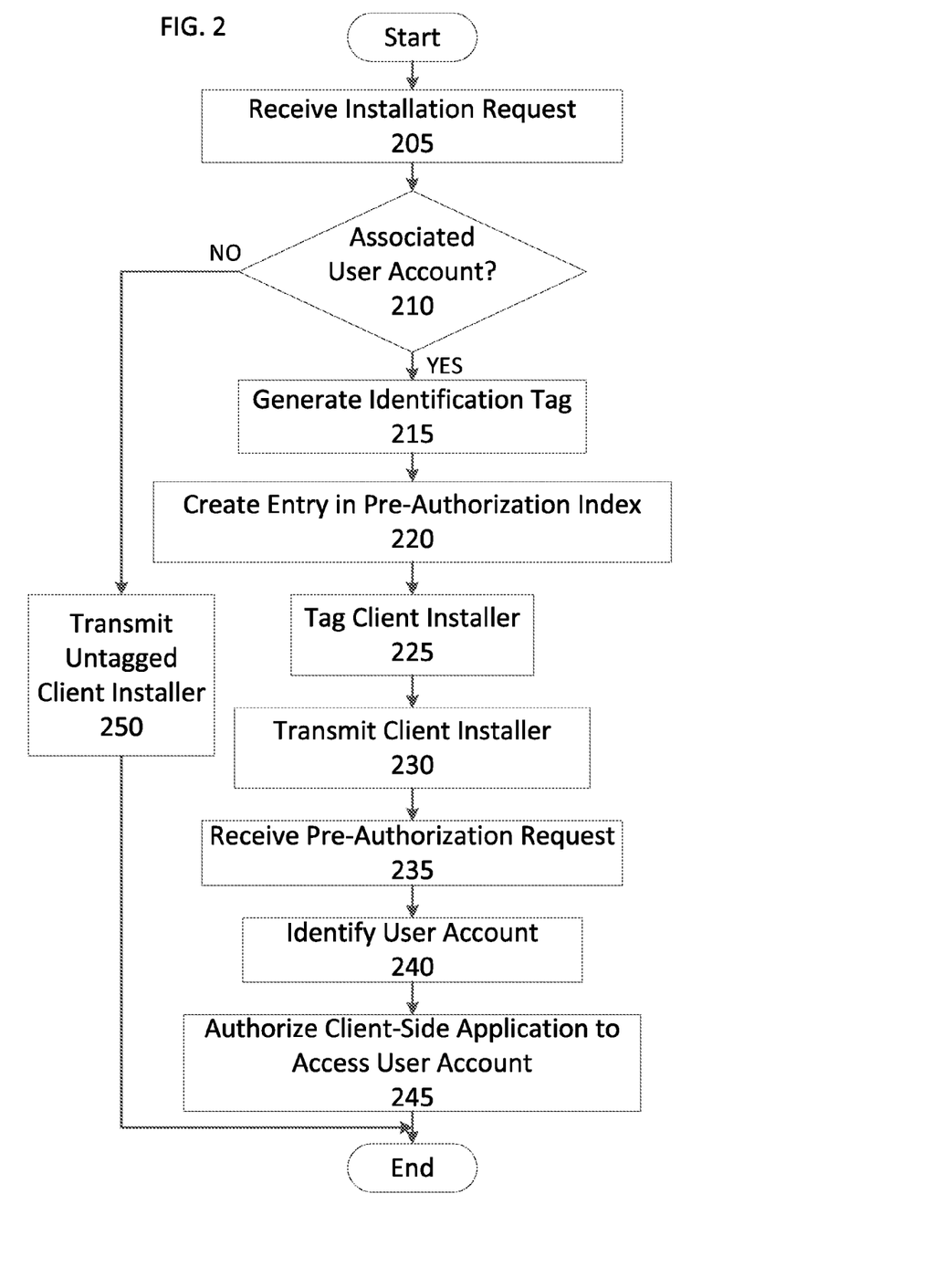
FIG. 2 shows an exemplary method embodiment of pre-authorizing a client-side application.

FIG. 2 shows an exemplary method embodiment of pre-authorizing a client-side application. Although specific steps are show in FIG. 2, in other embodiments the method can have more or less steps. As shown, the method begins at block 205 where the content management system receives an installation request from a client device to install the client-side application.

At block 210 the content management system determines if the installation request is associated with an active user account. For example, the content management system can determine if the client device is currently was logged into a user account at the time the installation request was received.

If at block 210 the content management system determines that the installation request is not associated with a user account, i.e. the client device was not logged into a user account when the installation request was received, the method continues to block 250 where the content management system transmits an untagged client installer to the client device. The untagged client installer can be used by the client device to install the client-side application, however the client-side application will not be pre-authorized to access a user account. A user will therefore be required to enter their login credentials to login to their user account.

Alternatively, if at block 210 the content management system determines that the installation request is associated with a user account, the method continues to block 215 where the content management system generates an identification tag. At block 220, the content management system creates an entry in the pre-authorization index that includes the identification tag and an account identifier identifying the associated user account.

At block 225 the content management system tags the client installer with the generated identification tag and, at block 230 transmits the tagged client installer to the requesting client device. The client device can use the tagged client installer to install the client-side application. The tagged identification tag can also be passed to the client-side application.

At block 235, the content management system receives a pre-authorization request from the client device that includes an identification tag. The pre-authorization request can be transmitted as a result of the client-side application being successfully installed on the client device. For example, the client-side application can be configured to automatically transmit the pre-authorization request to the content management system upon the client-side application being successfully installed on the client device.

At block 240, the content management system can identify the user account associated with the received identification tag. For example, the content management system can search the pre-authorization index to locate the identification tag and then identify the associated user account.

At block 245, the content management system can log the client-side application into the identified user account, thereby authorizing the client-side application to access content items assigned to the user account, assign new content items to the user account, etc. The method then ends.

While pre-authorizing a client-side application provides a simple user experience, it can also lead to potential security vulnerability if proper verification measures are not implemented. For example, a user can pass the tagged client installer to a friend that should not be pre-authorized to access the user account. Content management system 106 can be configured to implement one or more verification measures to ensure that the client-side application is only pre-authorized when installed by the appropriate user.

One such verification measure can be limiting the number of times the identification tag can be used to pre-authorize a client-side application. For example, the identification tag can be limited to enabling only one pre-authorization of a client-side application. Thus, if a user were to share their tagged client installer with a friend, the friend would not be logged into the user account, assuming that the intended user had already used the client installer to install the client-side application.

To accomplish this, pre-authorization module 136 can be configured to mark an identification tag as used after the identification tag has been used to authorize a client-side application. For example, pre-authorization module 136 can be configured to flag the pre-authorization index entry associated with the identification tag after the identification tag has been used to authorize a client-side application. Pre-authorization module 136 can be configured to deny pre-authorization requests including an identification tag marked as used.

As an alternative to marking the identification tag as used, pre-authorization module 136 can remove the pre-authorization index entry associated with the identification tag after it has been used to authorize a client-side application. Pre-authorization module 136 can be configured to deny pre-authorization requests when the included identification tag is not found in the pre-authorization index.

A second verification measure can be based on time. For example, each identification tag can be restricted to valid use within a predetermined amount of time after the identification tag was created, after which, the identification tag is deemed expired. Pre-authorization module 136 can deny pre-authorization requests that include an expired identification tag.

To accomplish this, pre-authorization module 136 can record the creation time of the identification tag in the pre-authorization index. Upon receiving a pre-authorization request, pre-authorization module 136 can compare the time the pre-authorization request was received to the recorded creation time of the received identification tag to determine whether the identification tag has expired. Alternatively, pre-authorization module 136 can record an expiration time for the identification tag in the pre-authorization index and the time the pre-authorization request was received can be compared to the expiration time to determine if the identification tag has expired. Pre-authorization module 136 can deny a pre-authorization request including an expired identification tag.

A third verification measure can be based on IP address. Pre-authorization module 136 can associate an identification tag with one or more IP addresses that restrict valid use of the identification tag to pre-authorization requests received from one of the associated IP addresses. For example, the identification tag can be associated with the IP address from which the installation request was received and/or IP addresses known to access the user account. Pre-authorization module 136 can deny pre-authorization requests received from an invalid IP address, i.e. an IP address that is not associated with the included identification signal.

To accomplish this, pre-authorization module 136 can list valid IP addresses in the pre-authorization index entry of the identification tag. For example, pre-authorization module 136 can gather the IP address from which the installation request was received and list the IP address in the pre-authorization index entry of the identification tag. Alternatively or additionally, pre-authorization module 136 can gather IP addresses from profile information associated with the user account and list them in the pre-authorization index entry of the identification tag.

Upon receiving a pre-authorization request, pre-authorization module can gather the IP address from which the pre-authorization request was received and compare it to the IP addresses listed in the pre-authorization index entry of the included identification tag to determine if the pre-authorization request was received from a valid IP address. Pre-authorization module 136 can deny pre-authorization requests received from invalid IP addresses, i.e. IP addresses not listed in the pre-authorization index entry of the included identification tag.

Figure 3:
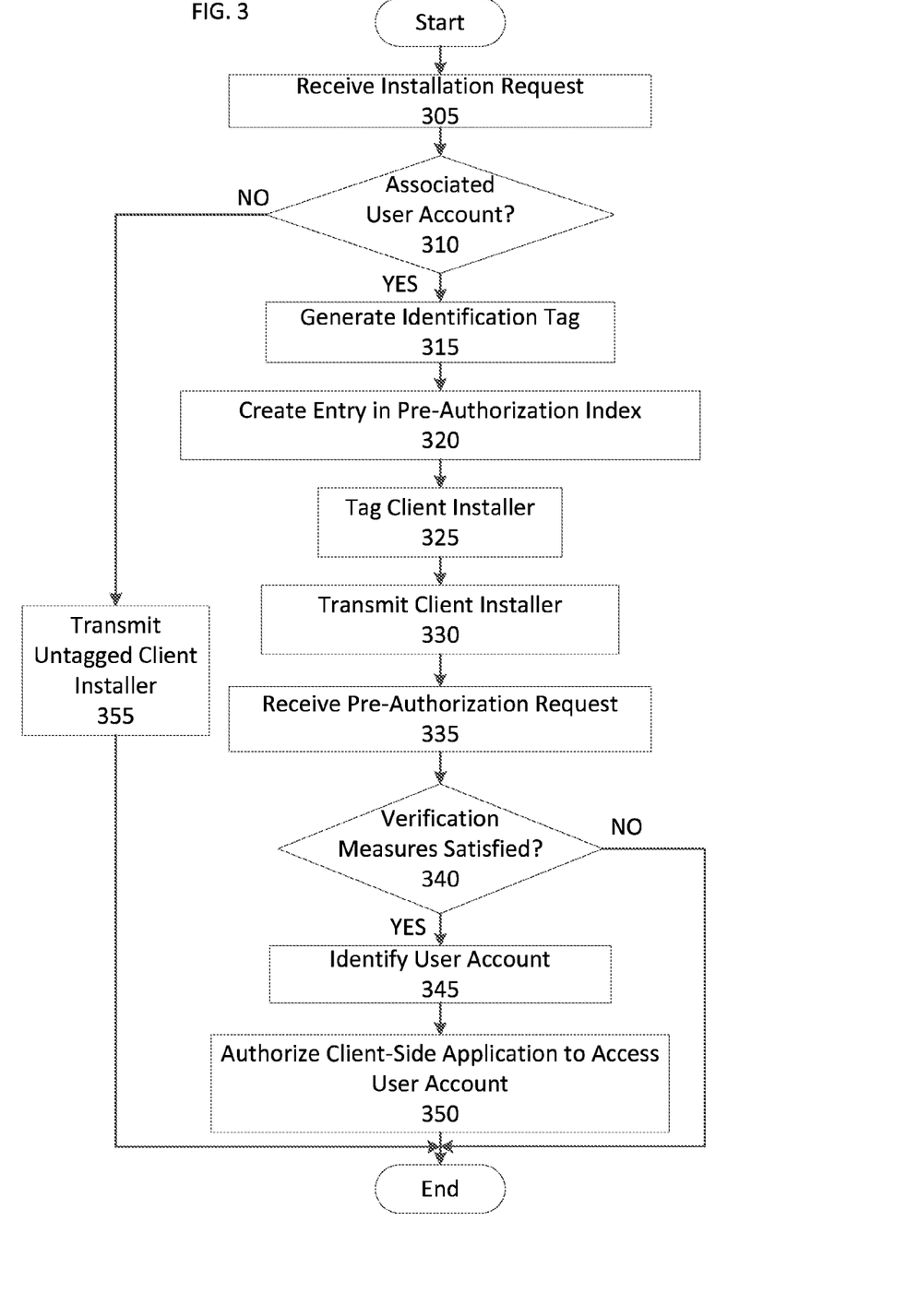
FIG. 3 shows an exemplary method embodiment of implementing verification measures to pre-authorize a client-side application.

FIG. 3 shows an exemplary method embodiment of implementing verification measures to pre-authorize a client-side application. Although specific steps are show in FIG. 3, in other embodiments the method can have more or less steps. As shown, the method begins at block 305 where the content management system receives an installation request to install the client-side application on a client device.

At block 310 the content management system determines if the installation request is associated with a user account. If the installation request is not associated with a user account, at block 355 the content management system transmits an untagged client installer to the client device. Alternatively, if the installation request is associated with a user account, the method continues to block 315 where the content management system generates an identification tag.

At block 320 the content management system creates an entry in the pre-authorization index. The entry can include the identification tag and an account identifier identifying the user account associated with the installation request. The entry can further include the creation time of the identification tag and valid IP addresses.

At block 325 the content management system tags a client installer with the identification tag and, at block 330, transmits the tagged client installer to the requesting client device.

At block 335 the content management system receives a pre-authorization request from a client device. At block 340 the content management system determines if the implemented verification measures are satisfied. This step is described in further detail in the discussion of FIG. 4 below. If the verification measures are not satisfied, the method continues to block 360 where the content management system denies the pre-authorization request. As a result, a user of the client device will be required to enter their login credentials to login the client-side application to their user account.

If at block 340 the content management system determines that the verification measures are satisfied, the method continues to block 345 where the content management system identifies the user account associated with the received identification tag. The content management system then, at block 350, approves the pre-authorization request by logging the client-side application in to the identified user account.

At block 365, the content management system updates the pre-authorization index entry to indicate that identification tag has been used to pre-authorize the client-side application. For example, the content management system can mark the pre-authorization index entry to indicate that the identification tag has been used. Alternatively, the content management system can delete the pre-authorization index entry. The method then ends.

Figure 4:
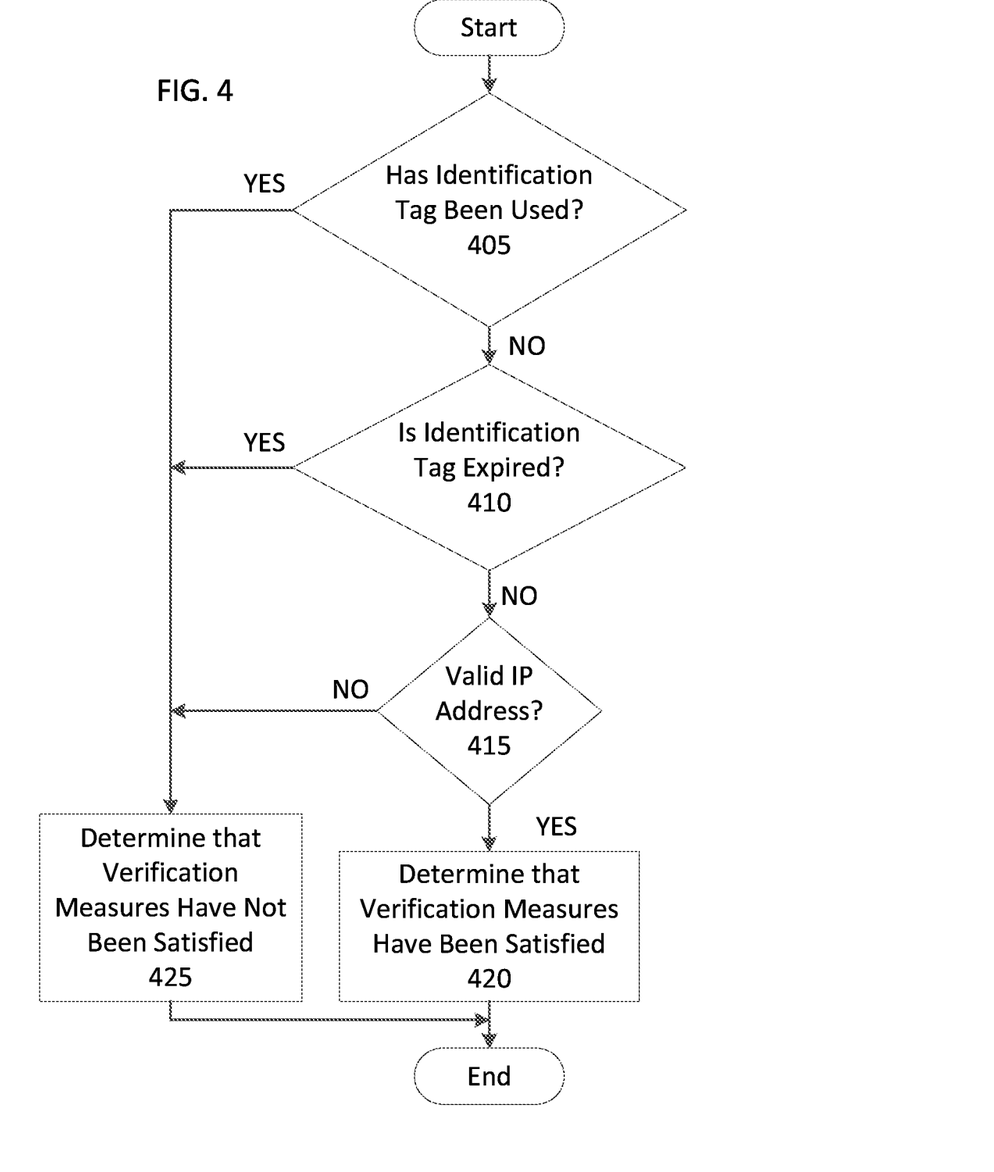
FIG. 4 shows an exemplary method embodiment of determining if verification measures are satisfied.

FIG. 4 shows an exemplary method embodiment of determining if verification measures are satisfied. Although specific steps are show in FIG. 4, in other embodiments the method can have more or less steps. As shown the method begins at block 405 where the content management system determines if the identification tag included in the pre-authorization request has been used before. The content management system can determine this by checking the pre-authorization index entry for the identification tag.

If at block 405 it is determined that the identification index has been used, the method continues to block 425 where the content management system determines that the verification measures are not satisfied and the method then ends.

Alternatively, if at block 405 it is determined that the identification tag has not yet been used, the method continues to block 410 where the content management system determines whether the identification tag has expired. For example, the content management system can retrieve a creation time or expiration time for the identification tag from the pre-authorization index entry of the identification tag. The content management system can then compare the retrieved creation or expiration time to the time the pre-authorization request was received to determine if the identification tag has expired.

If the identification tag has expired, the method continues to block 425 where the content management system determines that the verification measures are not satisfied. Alternatively, if the identification tag has not expired, the method continues to block 415 where the content management system determines whether the pre-authorization request was received from a valid IP address.

The content management system can identify valid IP addresses by accessing the pre-authorization index for the identification tag. For example, the pre-authorization index entry can list all valid IP addresses for the identification tag. The content management system can then compare the IP address from which the pre-authorization request was received to the valid IP addresses listed in the pre-authorization index entry to determine whether the pre-authorization request was received from a valid IP address.

If the IP address is not valid, the method continues to block 425 where the content management system determines that the verification measures are not satisfied. Alternatively, if the IP address is valid, the method continues to block 420 where the content management system determines that the verification measures are met. The method then ends.

While the above listed verification measures minimize the possibility that the client-side application will be pre-authorized on an unintended user's client device, a potential for security vulnerability still remains. For example, a user may pass their client installer to a co-worker that installs the client-side application prior to the intended user installing the client-side application and prior to the identification tag expiring. If the user and co-worker are on the same IP address at work, all three verification measures ($1^{st}$ use, time, IP address) can be met and the co-worker can be granted access to the user account.

To avoid this type of situation, the content management system can verify that the client device requesting pre-authorization is sufficiently associated with the intended user account prior to authorizing the client-side application to access the intended user account. A client device can be sufficiently associated with a user account if the client device was used to access the user account and/or create the user account.

The content management system can verify that a client device is sufficiently associated with a user account based on data cached on the client device. For example, a content management system can cause a web-browser application used to create or access a user account on the content management system to cache data, such as a cookie, identifying the user account that was created or accessed. The content management system can cross reference this cached data to verify whether the client device is sufficiently associated with the user account and, if so, authorize the client-side application.

To accomplish this, pre-authorization module 136 can tag the client installer with a web-browser identifier that identifies the web-browser application used to transmit the installation request to content management system 106. An installation request received from client device $102_i$ can include data identifying the web-browser application used to transmit the installation request to content management system 106. Pre-authorization module 136 can identify the web-browser application used to transmit the installation request, record the identified web-browser application in the pre-authorization index record and then tag the client installer with a web-browser identifier that identifies the web-browser application.

The client installer can pass the web-browser identifier to the client-side application. The client-side application can use the web-browser identifier to cause client device $102_i$ to execute the identified web-browser application and transmit a verification message, including any data cached by the web-browser application and the identification tag to content management system 106. Pre-authorization module 136 can verify that the cached data received along with a verification message identifies the user account identified by the corresponding identification tag.

Figure 5A:
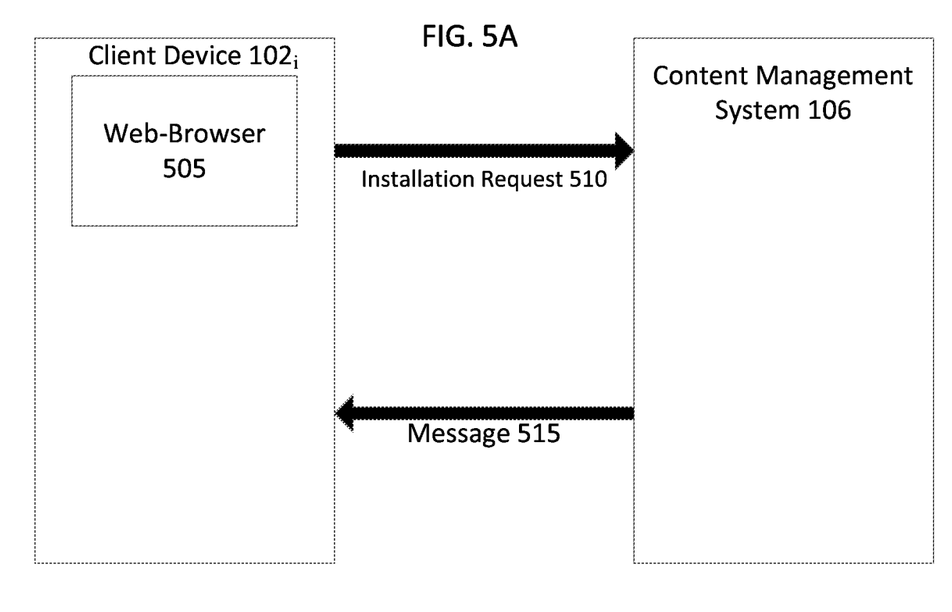
FIGS. 5A and 5B show an exemplary system embodiment of pre-authorizing a client-side application.
Figure 5B:
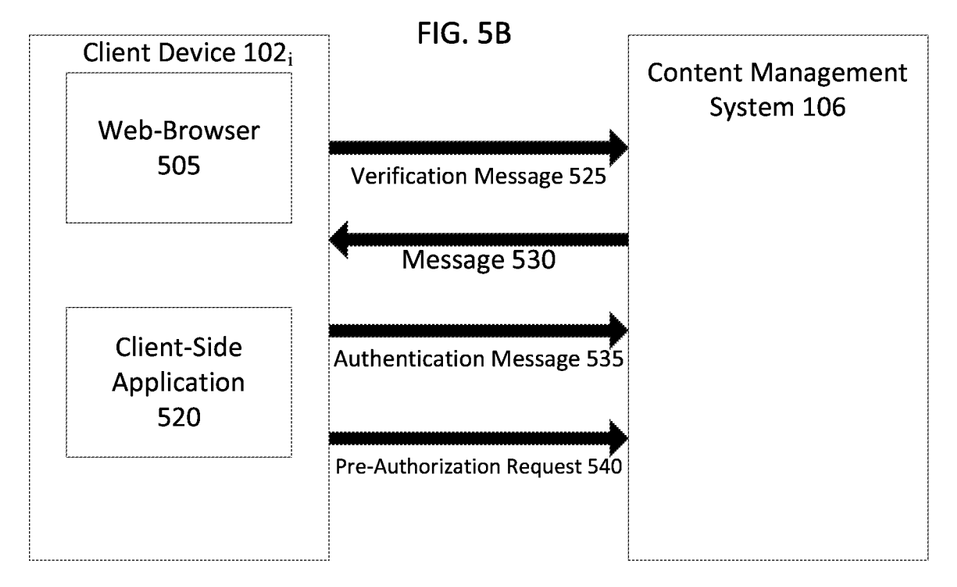

FIGS. 5A and 5B show an exemplary system embodiment of pre-authorizing a client-side application. As shown, client device $102_i$ includes web-browser application 505, which can be used to communicate with content management system 106 to access a user account on content management system 106. As shown, web-browser application 505 can transmit installation request 510 to content management system 106. Installation request 510 can be a request to install a client-side application on client device $102_i$.

Content management system 106 can receive installation request 510 and then determine whether installation request 510 is associated with a currently authorized user account. That is, content management system 106 can determined if client device $102_i$ is logged into a user account when installation request 510 was transmitted. For example, a user of client device $102_i$ may have used web-browser application 505 to login into their user account and then request to install the client-side application on client device $102_i$.

Assuming that content management system 106 determines that installation request 510 is associated with user account '123', content management system 106 can generate an identification tag and create an entry in a pre-authorization index that identifies user account '123', the generated identification tag, the date and time the identification tag was created, valid IP addresses and a web-browser identifier identifying the web-browser application used to generate installation request 510.

Content management system 106 can tag a client installer with the identification tag and the web-browser identifier. Content management system 106 can then transmit message 515, including the tagged client installer, to client device $102_i$.

Client device $102_i$ can then use the tagged client installer to install the client-side application on client device $102_i$. This can include passing the identification tag and web browser identifier to the installed client-side application.

FIG. 5B illustrates client device $102_i$ after client-side application 520 has been successfully installed. As shown, client-side application 520 can send verification message 525 to content management system 106, which includes the identification tag.

Upon receiving verification message 525, content management system 106 can perform various verification measures such as determining whether the identification tag has been used or has expired, and whether the IP address is valid. Assuming that the verification measures are satisfied, content management system 106 can transmit message 530 to client device $102_i$ indicating that the verification measures have been satisfied.

Upon receiving confirmation that the verification measures have been satisfied, client-side application 520 can generate an authentication key unique to client device $102_i$. For example, the authentication key can be 'xyz'. Client-side application 520 can then use the web-browser identifier to identify web-browser application 505 and cause client device $102_i$ to execute web-browser application 505. Client-side application 520 can cause web-browser application 505 to transmit authentication message 535, including the identification tag, authentication key and data cached by web-browser application 505, to content management system 106.

Content management system 106 can use the identification tag to locate the corresponding entry in the pre-authorization index and cross reference the cached data to determine if web-browser application 505 has been used to access the user account. For example, the cached data can include an account identifier that was cached when web-browser application 505 was used to create or access the user account.

Assuming that content management system 106 determines that web-browser application 505 was used to access the user account, content management system 106 can record the authentication key in the entry in the pre-authorization index.

Client-side application 520 can then transmit pre-authorization request 540 to content management system 106, including the identification tag and authentication key. Content management system 106 can perform verification measures, including determining whether the identification tag has been used or is expired, and whether the IP address is valid. Assuming that content management system 106 determines that the verification measures are satisfied, content management system 106 can compare the authentication key received in pre-authorization request 540 to the authentication key in the entry associated with the identification tag. If the authentication keys match, content management system 106 can authorize client-side application 520 to access the user account identified in the entry in the pre-authorization index.

Returning to the discussion of FIG. 1, pre-authorization module 136 can also be configured to pre-authorize a client-side application to access multiple user accounts. For example, a user may have a personal account and a work account. If the user is logged into both the work account and the personal account when requesting to install the client-side application, pre-authorization module 136 can pre-authorize the client-side application to access both the work account and the personal account.

To accomplish this, pre-authorization module 136 can tag the client installer to link the client installer to multiple user accounts. For example, pre-authorization module 136 can tag the client installer to link the client installer to a personal account and a work account. Pre-authorization module 136 can accomplish this by listing multiple account identifiers in the pre-authorization index associated with the generated identification tag. For example, pre-authorization module 136 can list a first account identifier identifying the personal account, and a second account identifier identifying the work account. Alternatively, pre-authorization module 136 can list a shared identifier that identifies both the personal account and user account.

Pre-authorization module 136 can access the listed account identifiers in response to receiving a pre-authorization request including the corresponding identification tag, and authorize the client-side application to access the identified user accounts if all verification measures are satisfied. The verification measures can include pre-authorization module 136 determining whether the identified user accounts are approved to be accessed by a client-side application while the client-side application is also accessing another user account. For example, a work account can be restricted by a work policy dictating that the work account cannot be accessed by a client-side application while the client-side application is accessing a second user account. Pre-authorization module 136 can determine whether the identified user accounts are restricted by such a policy.

If the identified user accounts are restricted, pre-authorization module 136 can be configured to authorize the client-side application to access only one of the user accounts. Alternatively, pre-authorization module 136 can prompt the user to select which user account the user wishes to authorize the client-side application to access. Alternatively, pre-authorization module 136 can deny the pre-authorization request, thus requiring the user to enter proper login credentials to authorize the client-side application to access a user account.

Pre-authorization module 136 can be configured to always prompt the user to select which of the multiple user accounts the user wishes to authorize on the client-side application. For example, the user can be prompted when the user requests to install the client-side application. This can include pre-authorization module 136 prompting the user to select either one or more of the user accounts or, alternatively, to select only one of the user accounts. Pre-authorization module 136 can tag the client installer to link the client installer to the selected user account(s).

Figure 6A:
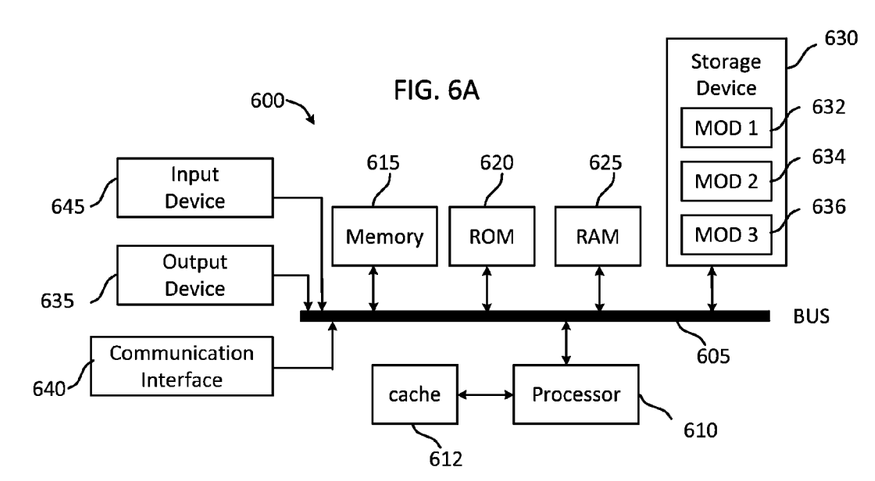
FIGS. 6A and 6B show exemplary possible system embodiments.
Figure 6B:
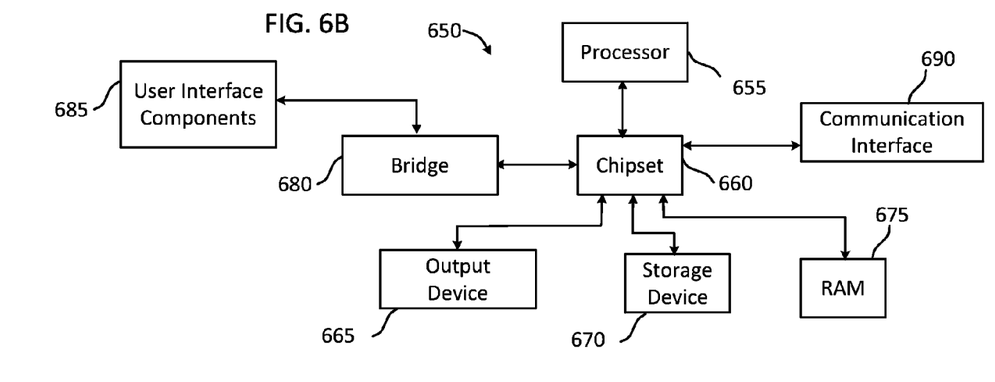

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A method comprising:
receiving, at a content management system from a first application on a client device, an installation request to install a second application on the client device;
determining whether the installation request is associated with an authenticated user account at the content management system;
when the installation request is associated with the authenticated user account, tagging an installer of the second application with an identification tag associated with the authenticated user account;
transmitting, to the client device, the installer tagged with the identification tag;
receiving, from the client device, a pre-authorization request associated with the second application, the pre-authorization request including the identification tag;
based on the identification tag in the pre-authorization request, determining that the second application is pre-authorized to access the authenticated user account; and
logging the second application into the authenticated user account at least partly in response to determining that the second application is pre-authorized to access the authenticated user account.

2. The method of claim 1, further comprising:
prior to receiving the installation request from the first application, receiving, from the first application running on the client device, login credentials associated with the authenticated user account;
based on the login credentials:
authenticating a user account associated with the login credentials to yield the authenticated user account; and
logging the first application into the content management system via the authenticated user account;
prior to sending the installer to the client device, verifying that the first application associated with the installation request is logged in via the authenticated user account; and
upon verifying that the first application associated with the installation request is logged in via the authenticated user account, determining that the installation request is associated with the authenticated user account.

3. The method of claim 1, further comprising:
creating an entry in a pre-authorization index, the entry including:
the identification tag,
a creation time of the identification tag,
an account identifier identifying the authenticated user account, and
an IP address.

4. The method of claim 3, wherein the first application comprises a web-browser application and the second application comprises a client-side application, the method further comprising:
receiving the preauthorization request indicating installation of the client-side application on the client device prior to an expiration of a predetermined period of time associated with the identification tag;
generating an authentication key;
in response to the client-side application being installed on the client device, causing the web-browser application to transmit an authorization message comprising the authentication key to the content management system;
receiving the authorization message and authentication key; and
in response to the authentication key matching a respective authentication key associated with the identification tag, logging the client-side application on the content management system via the authenticated user account.

5. The method of claim 3, further comprising:
identifying a requesting IP address that the pre-authorization request was received from; and
determining that the identification tag was received from an authorized IP address when the requesting IP address matches the IP address in the entry in the pre-authorization index.

6. The method of claim 3, further comprising:
determining whether the identification tag has been previously used to pre-authorize the second application, to yield a previous-usage determination; and
based on the previous-usage determination, determining that use of the identification tag to pre-authorize the second application does not exceed a previous use restriction, wherein the previous use restriction defines a maximum number of times that the identification tag can be used to pre-authorize the second application.

7. The method of claim 6, further comprising:
upon logging the second application via the authenticated user account on the content management system, flagging the entry in the pre-authorization index to indicate that the identification tag has been used to pre-authorize the second application.

8. A content management system comprising:
one or more processors; and
at least one memory containing instructions that, when executed by the one or more processors, cause the content management system to:
receive, from a first application on a client device, an installation request to install a second application on the client device;
determine whether the installation request is associated with an authenticated user account at the content management system;
when the installation request is associated with the authenticated user account, tag an installer of the second application with an identification tag associated with the authenticated user account;
transmit, to the client device, the installer tagged with the identification tag;
receive, from the client device, a pre-authorization request associated with the second application, the pre-authorization request including the identification tag;
based on the identification tag in the pre-authorization request, determine that the second application is pre-authorized to access the authenticated user account; and
log the second application into the authenticated user account at least partly in response to determining that the second application is pre-authorized to access the authenticated user account.

9. The content management system of claim 8, the at least one memory containing additional instructions which, when executed by the one or more processors, cause the content management system to:
prior to receiving the installation request from the first application, receive, from the first application running on the client device, login credentials associated with the authenticated user account;
based on the login credentials:
authenticate a user account associated with the login credentials to yield the authenticated user account; and
log the first application into the content management system via the authenticated user account;
prior to sending the installer to the client device, verify that the first application associated with the installation request is logged in via the authenticated user account; and
upon verifying that the first application associated with the installation request is logged in via the authenticated user account, determine that the installation request is associated with the authenticated user account.

10. The content management system of claim 8, the at least one memory containing additional instructions which, when executed by the one or more processors, further cause the content management system to:
create an entry in a pre-authorization index, the entry including:
the identification tag,
an account identifier identifying the authenticated user account,
a creation time for the identification tag, and
an IP address.

11. The content management system of claim 10, wherein the first application comprises a web-browser application and the second application comprises a client-side application, the at least one memory containing additional instructions which, when executed by the one or more processors, further cause the content management system to:
receive the preauthorization request indicating installation of the client-side application on the client device prior to an expiration of a predetermined period of time associated with the identification tag;
generate an authentication key;
in response to the client-side application being installed on the client device, cause the web-browser application to transmit an authorization message comprising the authentication key to the content management system;
receive the authorization message and authentication key; and
in response to the authentication key matching a respective authentication key associated with the identification tag, log the client-side application on the content management system via the authenticated user account.

12. The content management system of claim 10, the at least one memory containing additional instructions which, when executed by the one or more processors, further cause the content management system to:
identify a requesting IP address that the pre-authorization request was received from; and
determine that the identification tag was received from an authorized IP address when the requesting IP address matches the IP address in the entry in the pre-authorization index.

13. The content management system of claim 10, the at least one memory containing additional instructions which, when executed by the one or more processors, further cause the content management system to:
determine whether the identification tag has been previously used to pre-authorize the second application, to yield a previous usage determination; and
based on the previous usage determination, determine that use of the identification tag to pre-authorize the second application does not exceed a previous use restriction, wherein the previous use restriction defines a maximum number of times that the identification tag can be used to pre-authorize the second application.

14. The content management system of claim 13, the at least one memory containing additional instructions which, when executed by the one or more processors, further cause the content management system to:
upon pre-authorizing the second application to access the authenticated user account, mark the entry in the pre-authorization index to indicate that the identification tag has been used to pre-authorize the second application.

15. A non-transitory computer-readable medium containing instructions that, when executed by one or more processors, cause the one or more processors to:
receive, at a content management system, from a first application on a client device, an installation request to install a second application on the client device;
determine whether the installation request is associated with an authenticated user account at the content management system;
when the installation request is associated with the authenticated user account, tagging an installer of the second application with an identification tag associated with the authenticated user account;
transmit, to the client device, the installer tagged with the identification tag;
receive a pre-authorization request associated with the second application, the pre-authorization request including the identification tag;
based on the identification tag in the pre-authorization request, determine that the second application is pre-authorized to access the authenticated user account; and
authorize the second application to access the authenticated user account on the content management system at least partly in response to determining that the second application is pre-authorized to access the authenticated user account.

16. The non-transitory computer-readable medium of claim 15, storing additional instructions which, when executed by the one or more processors, further cause the one or more processors to:
prior to receiving the installation request from the first application, receive, from the first application running on the client device, login credentials associated with the authenticated user account;
based on the login credentials:
authenticate a user account associated with the login credentials to yield the authenticated user account; and
log the first application into the content management system via the authenticated user account;
prior to sending the installer to the client device, verify that the first application associated with the installation request is logged in via the authenticated user account; and
upon verifying that the first application associated with the installation request is logged in via the authenticated user account, determine that the installation request is associated with the authenticated user account.

17. The non-transitory computer-readable medium of claim 15, storing additional instructions which, when executed by the one or more processors, further cause the one or more processors to:
create an entry in a pre-authorization index, the entry including:
the identification tag,
an account identifier identifying the authenticated user account,
a creation time for the identification tag, and
an IP address.

18. The non-transitory computer-readable medium of claim 17, wherein the first application comprises a web-browser application and the second application comprises a client-side application, the non-transitory computer-readable medium including additional instructions which, when executed by the one or more processors, further cause the one or more processors to:
receive the preauthorization request indicating installation of the client-side application on the client device prior to an expiration of a predetermined period of time associated with the identification tag;
generate an authentication key;
in response to the client-side application being installed on the client device, cause the web-browser application to transmit an authorization message to the content management system, the authorization message including the authentication key;
receive the authorization message and authentication key; and
in response to the authentication key matching a respective authentication key associated with the identification tag, log the client-side application into the content management system via the authenticated user account.

19. The non-transitory computer-readable medium of claim 17, storing additional instructions which, when executed by the one or more processors, further cause the one or more processors to:
identify a requesting IP address that the pre-authorization request was received from; and
determine that the identification tag was received from an authorized IP address when the requesting IP address matches the IP address in the entry in the pre-authorization index.

20. The non-transitory computer-readable medium of claim 17, storing additional instructions which, when executed by the one or more processors, further cause the one or more processors to:
determine whether the identification tag has been previously used to pre-authorize the second application, to yield a previous usage determination;
based on the previous usage determination, determine that use of the identification tag to pre-authorize the second application does not exceed a previous use restriction, wherein the previous use restriction defines a maximum number of times that the identification tag can be used to pre-authorize the second application; and
upon authorizing the second application to access the authenticated user account, mark an index in the pre-authorization index to indicate that the identification tag has been used to pre-authorize the second application.

21. The non-transitory computer-readable medium of claim 20, wherein logging the second application into the authenticated user account comprises:
authenticating the second application to access the authenticated user account on the content management system without receiving, from the second application, login credentials associated with the second application.

* * * * *